US011428477B2

(12) United States Patent
Bissell et al.

(10) Patent No.: US 11,428,477 B2
(45) Date of Patent: Aug. 30, 2022

(54) HEAT BATTERY ASSEMBLIES AND MONITORING SYSTEM THEREFOR

(71) Applicant: SunAmp Limited, Edinburgh (GB)

(72) Inventors: Andrew John Bissell, Edinburgh (GB); Santokh Singh Gataora, Edinburgh (GB); Maurizio Zaglio, Edinburgh (GB)

(73) Assignee: SUNAMP LIMITED, Edinburgh (GB)

( * ) Notice: Subject to any disclaimer, the term of this patent is extended or adjusted under 35 U.S.C. 154(b) by 549 days.

(21) Appl. No.: 16/395,831

(22) Filed: Apr. 26, 2019

(65) Prior Publication Data

US 2019/0316851 A1 Oct. 17, 2019

Related U.S. Application Data

(63) Continuation of application No. 14/895,509, filed as application No. PCT/GB2014/051681 on Jun. 2, 2014, now Pat. No. 10,317,146.

(30) Foreign Application Priority Data

May 31, 2013 (GB) ..................... 1309757

(51) Int. Cl.
F28D 20/02 (2006.01)
(52) U.S. Cl.
CPC ......... *F28D 20/028* (2013.01); *F28D 20/021* (2013.01); *F28F 2265/12* (2013.01); *F28F 2265/14* (2013.01); *Y02E 60/14* (2013.01)
(58) Field of Classification Search
CPC .. F28D 20/028; F28D 20/021; F28F 2265/12; F28F 2265/14; Y02E 60/145
See application file for complete search history.

(56) References Cited

U.S. PATENT DOCUMENTS

| 5,605,190 | A | | 2/1997 | Strahle | |
|---|---|---|---|---|---|
| 5,649,431 | A | | 7/1997 | Schroeder | |
| 6,102,103 | A | * | 8/2000 | Zobel | B60H 1/00492 165/10 |
| 10,317,146 | B2 | * | 6/2019 | Bissell | F28D 20/028 |
| 2009/0194257 | A1 | * | 8/2009 | Niu | F28D 15/00 165/104.17 |
| 2010/0252232 | A1 | | 10/2010 | Reich | |

(Continued)

FOREIGN PATENT DOCUMENTS

CN 102348950 A 2/2012
DE 10 2009 012318 9/2010

(Continued)

OTHER PUBLICATIONS

Korean Office Action for Application No. 10-2015-7036858, dated May 22, 2020.

(Continued)

*Primary Examiner* — Tho V Duong
(74) *Attorney, Agent, or Firm* — Barnes & Thornburg LLP (57) ABSTRACT

There are herein described energy storage systems. More particularly there are provided thermal energy storage systems comprising battery assemblies containing phase change materials and a monitoring system therefor. In addition there are provided thermal stores comprising battery assemblies having integral control means for management of the thermal energy provided by the battery assembly.

16 Claims, 6 Drawing Sheets

(56) References Cited

U.S. PATENT DOCUMENTS

| | | | |
|---|---|---|---|
| 2010/0281889 A1* | 11/2010 | Reich | F24F 5/0017 |
| | | | 62/66 |
| 2011/0083459 A1* | 4/2011 | Salyer | F24H 7/0408 |
| | | | 62/238.3 |
| 2011/0146940 A1* | 6/2011 | Golbs | F28D 20/028 |
| | | | 165/10 |
| 2012/0227926 A1* | 9/2012 | Field | F24S 60/10 |
| | | | 165/10 |
| 2012/0241122 A1 | 9/2012 | Xiang | |
| 2013/0146000 A1 | 6/2013 | Choi | |
| 2013/0258582 A1 | 10/2013 | Shelnutt | |
| 2014/0102662 A1* | 4/2014 | Grama | F28D 20/0034 |
| | | | 165/10 |
| 2014/0158340 A1* | 6/2014 | Dixler | F28D 20/02 |
| | | | 165/287 |

FOREIGN PATENT DOCUMENTS

| | | |
|---|---|---|
| DE | 102009012318 A1 | 9/2010 |
| DE | 102011007626 | 10/2012 |
| EP | 2 482 021 | 8/2012 |
| WO | 2002/012814 | 2/2002 |
| WO | 2009/138771 | 11/2009 |
| WO | 2010/092391 A1 | 8/2010 |
| WO | 2012/166650 A1 | 12/2012 |

OTHER PUBLICATIONS

Singapore Search Report for Application No. 11201509942T, dated Sep. 21, 2016.

* cited by examiner

FIGURE 6

HEAT BATTERY ASSEMBLIES AND MONITORING SYSTEM THEREFOR

CROSS-REFERENCE TO RELATED APPLICATIONS

This application is a U.S. continuation application of U.S. Ser. No. 14/895,509, filed Dec. 3, 2015, which claims priority to International Application No. PCT/GB2014/051681, filed Jun. 2, 2014, and United Kingdom Application No. 1309757.1, filed May 31, 2013, the entire contents of which are hereby incorporated herein by reference.

FIELD OF THE INVENTION

The present invention relates to energy storage systems. More particularly the invention relates to thermal energy storage systems comprising battery assemblies containing phase change materials and a monitoring system therefor. More particularly, the present invention relates to thermal stores comprising battery assemblies having integral control means for management of the thermal energy provided by the battery assembly.

BACKGROUND OF THE INVENTION

There are many heating and cooling systems on the market and many of these rely on fossil fuels. With the ever increasing demand for more environmentally friendly systems various alternative systems based on sunlight or water have been proposed such as for example, photovoltaic, solar thermal electricity generators, hydroelectricity, wave power and bio-fuels.

An issue common to all solar-driven renewable energy conversion devices, some hydro-driven devices, and wind turbines is that they cannot operate "on demand" as the sun does not always shine, the seas are not always high and the wind does not always blow. This means that at some times these so-called intermittent renewable sources will generate electricity which cannot be easily integrated into their corresponding local electricity grids, and as such there have been a number of storage solutions proposed.

The thermal energy storage system, proposed in WO 2009/138771 converts surplus electrical energy from intermittent renewable sources into heat or cool when available, store the so-converted heat or cool in a thermal store, and then make it available as useful heat or cool on demand using phase change materials (PCMs) to effect the energy conversion via their inherent solid-liquid phase changing properties.

In known thermal energy storage systems, comprising heat batteries containing phase change materials, the phase changing material within each battery, will during its most active energy storage and release phase, change from solid to liquid and vice versa over about a 6° C. temperature range. To date, it has only been possible to predict the charge state of any such battery by using a large number of temperature sensors inside the batteries, which is neither practical nor cost effective.

For practical application, in high-demand, commercial or industrial situations in particular, thermal energy storage systems including phase change materials which have determinable efficiency measures would be highly desirable to enable effective predictions of energy reserves for planning and energy management purposes.

It is an object of at least one aspect of the present invention to provide a thermal storage system having integral means for providing residual energy measures.

It is an object of at least one aspect of the present invention to provide a thermal storage system having integral means for efficient charging of batteries within an assembly.

It is an object of at least one aspect of the present invention to provide a thermal storage system having integral means for predicting the charge state of batteries within an assembly.

It is an object of at least one aspect of the present invention to provide a thermal storage system having integral means for determination of relative energy levels within batteries within an assembly.

It is an object of at least one aspect of the present invention to provide a thermal storage system having integral means for protection of batteries within an assembly against over pressurisation. The Applicant has developed a novel and inventive thermal storage system comprising heat batteries having internal heat exchangers and PCMs wherein said system includes integral means for providing a variety of control measures including: overall system energy efficiency measures; measures of battery charging efficiency; determination of relative energy levels within batteries; and wherein said system provides protection of said batteries against over pressurisation.

SUMMARY OF THE INVENTION

The Applicant has developed novel and inventive thermal storage system comprising heat batteries having internal heat exchangers and PCMs.

Accordingly the present invention provides a thermal storage system comprising a thermal energy store containing a single or a plurality of battery casings having internal heat exchangers and phase change materials and means for controlling the operation of said thermal energy store, wherein each of said battery casing independently contains a battery comprising one or more heat exchangers anchored within said casing, a phase change material and means for protection against over pressurisation of said battery, and wherein said controlling means is provided by a one or a plurality of sensors for the measurement of temperature, and/or pressure, and/or power at one or multiple points within the system.

The controlling means may be an integral system controller.

The controlling means may be adapted to provide measurements of the charging and discharging circuit flow rates of said system via one or more power sensors.

The controlling means may be adapted to provide means for efficient charging of the individual batteries within the assembly via one or more input temperature sensors and one or more diverter valves.

The controlling means may be adapted to provide measurements of the energy stored within, and the power input of individual batteries within said system, and of the overall battery assembly via said one or more input temperature sensors.

The controlling means may be adapted to provide measurements of the energy delivered by each battery within the assembly and the residual energy in each of said batteries during discharging via one or more output temperature sensors.

The phase change materials within the system may be protected from contact with external contaminants or degrading components via the provision of sealed battery casings.

The battery casings may be constructed from metals, alloys, plastics, composite sandwiches or composite materials.

The battery casings may withstand an internal pressure of from 0.0 bar to 4.0 bar.

Multiple battery casings may be stacked without intermediate supports.

Heat exchangers may be integrated with loading and unloading heat exchangers which are anchored within the batteries and wherein the contact area between each heat exchanger and each battery casing is minimal.

The battery housing may include means for protection against over pressurisation via one or more pressure relief valves, or one or more pressure rupture discs.

The phase change materials may be utilised within the batteries to have a solid to liquid phase change within a temperature range of from 0° C. to 100° C. and wherein the operative range of said phase change materials is between a 4 and 8 degree difference in temperature.

The system may comprise means for phase change material expansion management wherein said means is in operative connection with a vapour barrier, and either a pressure relief valve, or a burst disc assembly.

The system may comprise means for phase change material expansion management provided by external or internal volume compensation features, or by pressurised case design features, in relation to each individual battery within said assembly and wherein said means is in operative connection with a vapour barrier, and either a pressure relief valve, or a burst disc assembly.

The system may additionally comprising means for determining the energy inputs and outputs of, and the balance within, any individual battery (8) within the system via a series of sensors for the determination of $Q_{IN}$, $Q_{ON}$ and ON wherein $$Q_{IN}=[\Sigma(F_I \times \rho_I \times Cp_I) \times (T_5-T_4)]/3600; \text{ and}$$

$$Q_{ON}=[\Sigma(F_O \times \rho_O \times Cp_O) \times (T_{10}-T_9)]/3600; \text{ and}$$

$$Q_N=Q_{N-1}+Q_{IN}-Q_{ON}; \text{ and}$$

wherein $Q_{IN}$=Energy input to the battery during the last charge cycle;
$Q_{ON}$=Energy output from the battery during the last discharge cycle;
$Q_{IN}$=Current stored energy in the battery;
$O_{N-1}$=Energy stored in the battery before current audit;
$F_I$=Charging circuit flow rate;
$F_O$=Discharging circuit flow rate;
$\rho_I$=Density of charging circuit fluid;
$\rho_O$=Density of discharging circuit fluid;
$Cp_I$=Specific heat of charging circuit fluid;
$T_{CFT}$=Battery X charging circuit flow temperature;
$T_{CRT}$=Battery X charging circuit return temperature;
$T_{DFT}$=Battery X discharging circuit flow temperature; and
$T_{DRT}$=Battery X discharging circuit return temperature.

The control system may be adapted to provide means for the determination of the status of the batteries within the system via the following series of algorithms:

a) If (Q=1 and $\delta P \leq P_{L1}$) OR (Q=1 and $P_{BC} \leq P_A$), then:
   Battery case is not air tight
   Activate appropriate alarm/warning
   Put this battery in standby mode (Q=0)

b) If (Q=1 and $\delta P \geq P_{L2}$) OR (Q=1 and $P_{BC} \geq P_{L3}$), then:
   Battery case pressure is exceeding the maximum operating limit
   Activate appropriate alarm/warning
   Put this battery in standby mode (Q=0)

c) If (Q=0 and $T_{BC} \leq T_E$), then:
   Put this battery in charging mode 10=11
   SOC=0 d) If (Q=1 and $\delta T \geq T_{L2}$) OR (Q=1 and $T_{BC} \geq T_{L3}$), then:
   Battery case temperature is exceeding the maximum operating limit
   Activate appropriate alarm/warning
   Put this battery in standby mode (Q=0)

e) If ($P_{AB1} \leq ABS(\delta P) \leq P_{AB2}$) OR ($P_A \leq P_{BC} \leq P_B$) OR ($T_E \leq T_{BC} \leq T_F$) OR ($T_{EF1} \leq ABS(\delta T) \leq T_{EF2}$), then the battery is operating in zone AB (See FIG. 6(a)) corresponding to zone EF (See FIG. 6(b)) SOC=$100 \cdot m_{PCM} \cdot Cp_s \cdot \delta T_s/E_{TOT}$ f) If ($P_{BC1} \leq ABS(\delta P) \leq P_{BC2}$) OR ($P_B \leq P_{BC} \leq P_C$) OR ($T_F \leq T_{BC} \leq T_G$) OR ($T_{FG1} \leq ABS(\delta T) \leq T_{FG2}$), then the battery is operating in zone BC (See FIG. 6(a)) corresponding to zone FG (See FIG. 6(b)) SOC=$100 \cdot (Es_L + F_{BC} \cdot C_{BC} \cdot P_B)/E_{TOT}$ g. If ($P_{CD1} \leq ABS(\delta P) \leq P_{CD2}$) OR ($P_C \leq P_{BC} \leq P_D$) OR ($T_G \leq T_{BC} \leq T_H$) OR ($T_{GH1} \leq ABS(\delta T) \leq T_{GH2}$), then the battery is operating in zone CD (See FIG. 6(a)) corresponding to zone GH (See FIG. 6(b)) SOC=$100 \cdot (Es_L + E_L + m_{PCM} \cdot Cp_L \cdot \delta T_L)/E_{TOT}$

TABLE 2

| Symbol | Definition | Measurement |
|---|---|---|
| $Q_{IN}$ | Battery charging state | 1 = Active, 0 = Standby |
| $\delta P$ | Rate of pressure change | Pa/s |
| $P_{L1}$ | Minimum rate of pressure change limit | Pa/s |
| $P_{BC}$ | Battery case pressure | Pa |
| $P_A$ | Base reference pressure | Pa |
| $P_{L2}$ | Maximum rate of pressure change limit | Pa/s |
| $P_{L3}$ | Maximum battery case working pressure | Pa |
| $T_{BC}$ | Battery case temperature | K |
| $T_E$ | Base reference temperature | K |
| SOC | State fo charge of the battery | |
| $\delta T$ | Rate of temperature change | K/s |
| $T_{L2}$ | Maximum rate of temperature change limit | K/s |
| $T_{L3}$ | Maximum battery case working temperature | K/s |
| $P_{AB1}$ | Rate of pressure change in zone AB - Lower limit | Pa/s |

TABLE 2-continued

| Symbol | Definition | Measurement |
|---|---|---|
| $P_{AB2}$ | Rate of pressure change in zone AB - Upper limit | Pa/s |
| $P_A$ | Battery pressure at operating point A in FIG. 6(a) | Pa |
| $P_B$ | Battery pressure at operating point B in FIG. 6(a) | Pa |
| $T_F$ | Battery temperature at operating point F in FIG. 6(b) | K |
| $T_{EF1}$ | Rate of temperature change in zone EF - Lower limit | K/s |
| $T_{EF2}$ | Rate of temperature change in zone EF - Upper limit | K/s |
| $\delta T_s$ | Temperature difference between battery temperature $T_{BC}$ and minimum reference temperature $T_E$ | K |
| $P_{BC1}$ | Rate of pressure change in zone BC - Lower limit | Pa/s |
| $P_{BC2}$ | Rate of pressure change in zone BC - Upper limit | Pa/s |
| $P_C$ | Battery pressure at operating point C in FIG. 6(a) | Pa |
| $T_G$ | Battery temperature at operating point G in FIG. 6(b) | K |
| $T_{FG1}$ | Rate of temperature change in zone FG - Lower limit | K/s |
| $T_{FG2}$ | Rate of temperature change in zone FG - Upper limit | K/s |
| $F_{BC}$ | Scaling factor for - Zone BC | — |
| $C_{BC}$ | Correction factor (Power & PCM) | — |
| $P_{CD1}$ | Rate of pressure change in zone CD - Lower limit | Pa/s |
| $P_{CD2}$ | Rate of pressure change in zone CD - Upper limit | Pa/s |
| $P_C$ | Battery pressure at operating point C in FIG. 6(a) | Pa |
| $P_D$ | Battery pressure at operating point D in FIG. 6(a) | Pa |
| $T_G$ | Battery temperature at operating point G in FIG. 6(b) | K |
| $T_H$ | Battery temperature at operating point H in FIG. 6(b) | K |
| $T_{GH1}$ | Rate of temperature change in zone GH - Lower limit | K/s |
| $T_{GH2}$ | Rate of temperature change in zone GH - Upper limit | K/s |
| $\delta T_L$ | Temperature difference between battery temperature $T_{BC}$ and upper temperature of the melting zone $T_G$ | K |

DESCRIPTION OF FIGURES

Embodiments of the present invention will now be described, by way of example only, with reference to the accompanying drawings in which:

FIG. 6(a) is an illustration of the relationship between internal battery pressure and battery state of charge; and.

FIG. 6(b) is an illustration of the relationship between internal battery temperature and battery state of charge;

DETAILED DESCRIPTION

The novel thermal energy storage systems according to the present invention are assembled from a plurality of heat batteries each containing integrated loading and unloading heat exchanger(s) and phase change material(s), PCM(s). An illustration of a heat battery according to the invention is provided at FIG. 1. Despite the image showing a cuboid shape, the present invention is not limited to this and includes battery of different shape, e.g. cylindrical, spherical, pyramidal, and more. Furthermore, despite the image showing only one PCM in the enclosure, this invention includes also the combination of different PCMs in the same enclosure and the combination of PCMs and other materials, e.g. oils, waxes, and more;

Each heat battery can be connected to the hydraulic pipe entering or leaving each port through various means that ensure a waterproof connection, e.g. tank connector, soldering, brazing, crimping;

The thermal energy storage systems according to the present invention include an integral system controller wherein the particular control functions of said controller can be adapted according to the particular application/utility of the system. The controller utilises power sensors (as indicated by F1 and F2 in FIGS. 2 and 5) for the measurement of the charging and discharging circuit flow rates of the system respectively, said power sensors may each be comprised of a combination of flow sensor, temperature sensors and computation engine to derive thermal power. The controller also utilises input temperature sensors (as indicated by T1 to T5 in FIGS. 2 and 5) and diverter valves (as indicated by DV1 to DV5 in FIGS. 2 and 5) to control efficient charging of the individual batteries within the assembly, using pre-defined rules, as detailed hereinafter, which depend upon the application and the type of PCM in the batteries. These temperature sensors are also used for calculating the energy stored and the power input, of both individual batteries within the assembly, as well as of the overall battery assembly.

The system controller also uses output temperature sensors (as indicated by T6 to T10 in FIGS. 2 and 4) to determine the energy delivered by each battery within the assembly and the residual energy in each of said batteries during discharging. In addition the system controller may also determines the charge status of the batteries from the pressures measured by pressure sensors (as indicated by PS1 to PS4 in FIGS. 2 and 5). The function of these pressure sensors are described in more detail hereinafter. The controller may also uses global temperature sensors to determine the average temperature of the PCM inside the enclosure (as indicated by TG1 to TG4 in FIGS. 2 and 5).

A particular feature of the thermal energy storage systems according to the present invention is the protection of the PCM within the battery assembly from the ingress of oxygen and water vapour, and the like by sealing to prevent external contaminants/degrading components such as fresh air or water vapour from contacting the PCM(s), or the loss of PCM components for example by dehydration. This is accomplished via the provision of sealed batteries, more particularly sealed battery casings, or by the addition of a substance on top of the PCM(s) acting as a barrier against vapour or air or contaminants exchange, e.g. oil. Thus according to a further aspect the present invention provides thermal energy storage systems according to any of the previously provided aspects wherein the one or more batteries are sealed or an additional substance is added on top of the PCM(s) acting as a vapour/air/contaminants barrier.

Suitable materials for construction of battery casings, sometimes called battery housings, for use in the battery assemblies within the thermal storage systems according to the present invention are selected on their dual ability to both shield the PCM from ingress/egress of water vapour and ingress of oxygen in order to minimise the deterioration of the thermal performance of the battery, and also to provide sufficient structural support/strength to support one or more batteries in a stacked system without the need for intermediate structural supporting means. In case an additional substance is used as a barriers against water vapour, oxygen, and further contaminants, the casings must only provide structural support/strength to support one or more batteries in a stacked system.

Suitable casing materials for use herein include metals and alloys, coated metals and alloys, plastics, composite sandwiches of materials and composite materials. Composite sandwiches as defined herein mean a casing having an additional insulating layer, either adjacent to a casing layer or intermediate between two casing layers. Exemplar composite sandwiches include: metal/insulation/metal; plastic/insulation/plastic; plastic/insulation/metal; metal/insulation; plastic/insulation. Composite materials as defined herein include a casing composed by plastic with a metal reinforcement. Exemplar composite materials include plastic with metal mesh enclosed in the plastic layer. Thus according to a further aspect the present invention provides thermal energy storage systems according to any of the previously provided aspects wherein the battery casing is a metal, metal alloy, plastic or composite sandwich.

Thus the selection of a particular metal, coated metal, plastic, sandwich or composite material will be determined by a variety of factors including: the strength to support one or more batteries thereupon in a stacked system, the permeability to air and vapour, the particular PCM to be used (including its density, its melting temperature and its chemical attack properties with respect to the composite material), the thermal insulation properties, the proposed utility and/or operating conditions of the thermal storage system and such like. Suitable metals and alloys include: Copper, Brass, Aluminium, and stainless steel with the selection of a preferred metal for a specific utility depending upon the type of PCM and operating conditions. For example preferred metals for use in battery casings for use with calcium chloride hexahydrate include copper and brass, while for use with sodium acetate trihydrate aluminium, stainless steel, copper, or brass. For example preferred coated metals for use with calcium chloride hexahydrate include stainless steel with copper coating.

Plastics providing a suitable water vapour and oxygen barrier layer are suitable for use herein. Suitable plastics for use include: polypropylene, expanded polypropylene, cross-linked polyethylene, polycarbonate, polyphenyl sulphide, ethylene vinyl alcohol (EVOH) copolymer, nylon. A filling agent such as glass fibre may be included in the plastic.

Insulating materials suitable for use herein include: expanded polypropylene, silica aerogel, vacuum insulation, expanded polyurethane.

Exemplar composite sandwiches for use as battery casing materials herein include: nomex honeycomb encased in carbon fibre, aluminium honeycomb encased in carbon or aluminium, aluminium honeycomb encased in polypropylene, aluminium layer enclosed in polypropylene layer(s), and any combination of any abovementioned plastics and metals.

Exemplar composite sandwiches for use as battery casing materials herein include: nylon layer reinforced with stainless steel net, polypropylene reinforced with aluminium bar, and any combination of the previous plastics and metals.

The heat exchangers inside each battery casing are anchored so that they can expand and contract in all three planes, within said casing, without stressing the casing or the inter-connected heat exchanger assembly as a whole. The heat exchanger supports are arranged so that the contact area between each heat exchanger and each battery casing is minimal (<600 mm$^2$ for 2.5 kWh battery) in order to minimise conduction heat losses and thereby increase the heat efficiency of the overall system.

The battery case is designed to withstand 2.0 times the normal working pressure of the thermal energy storage system. Although the working pressure will depend upon the size, application and type of PCM, utilised in said system, it will typically range between 0.0 bar and 2.0 bar. Thus according to a further aspect the present invention provides thermal energy storage systems according to any of the previously provided aspects wherein the battery casing can withstand an internal pressure of from 0.0 bar to 4.0 mbar.

The battery casing materials of sufficient strength are selected so that batteries can be stacked up to a plurality of batteries without intermediate supports, e.g. 6 batteries. Thus according to a further aspect the present invention provides thermal energy storage systems according to any of the previously provided aspects wherein the battery casing is a metal, metal alloy, coated metal, coated alloy, plastic, composite sandwich or composite material having sufficient strength for an individual battery to support a plurality of additional batteries in a multiple-stack battery system without intermediate supports.

Figure 5:
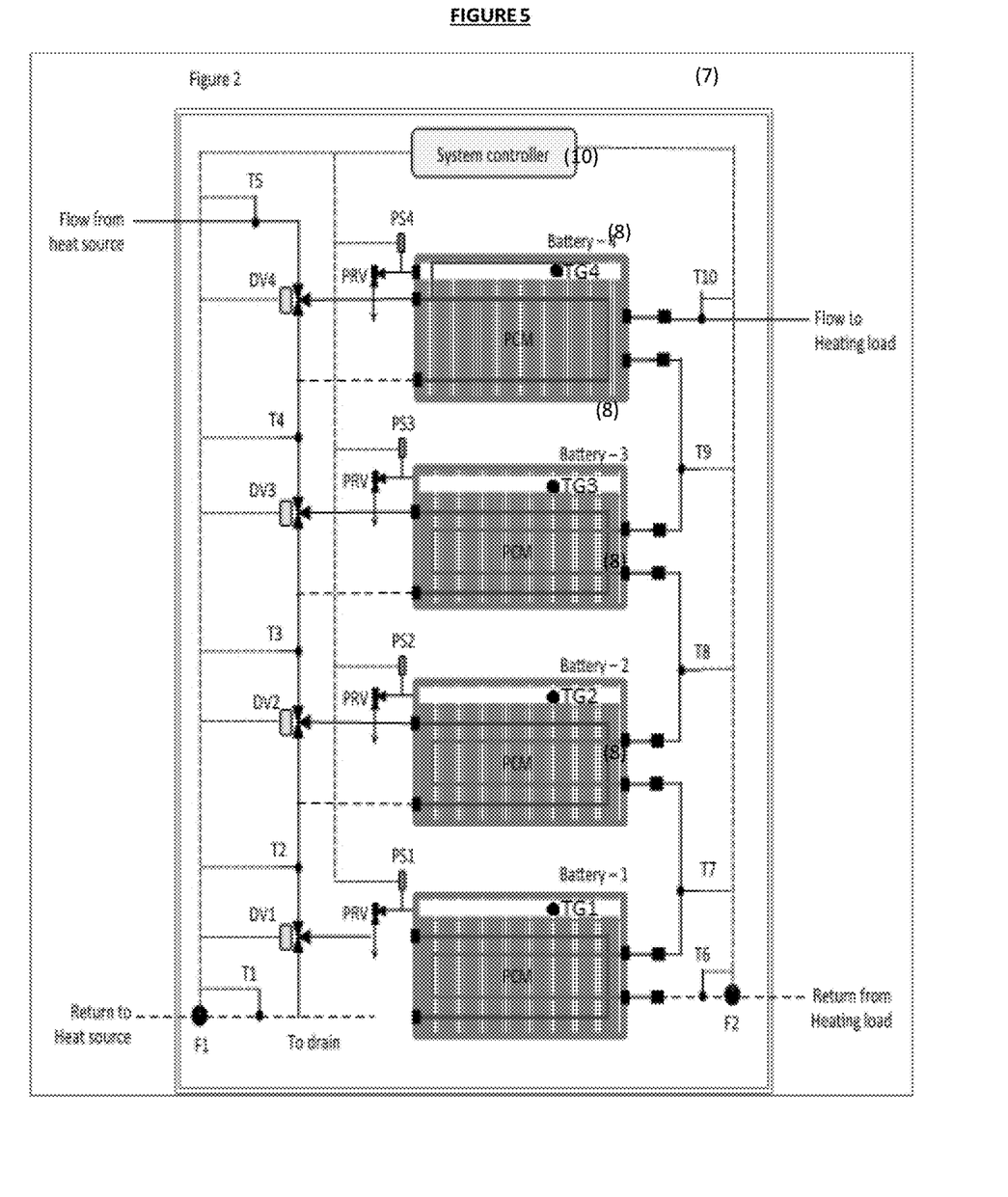
FIG. 5 is a schematic view of a thermal storage system according to an alternative embodiment of the present invention.

As illustrated hereinafter in FIGS. 2 and 5 the thermal energy storage systems according to the invention comprise a single or a plurality of battery assemblies as described hereinbefore which may be arranged in a stacked system, having in particular a stacked battery arrangement which may be independently selected multiple stacked batteries. This also includes the capability to place the batteries side by side in a single layer arrangement, or in multiple layers with two or more batteries side by side on each layer, and not necessarily the same number of batteries side by side on each layer.

A further advantageous feature of the thermal energy storage systems according to the present invention is means for protection of the one or more battery casing(s) against over pressurisation. As detailed hereinafter this is achieved by means of one or more pressure relief valve(s), or one or more pressure rupture disc(s), or via a combination thereof, or via an aperture with surroundings in the case where an additional substance on top of the PCM acts as a barrier against air, water vapour, and contaminants. Thus according to a further aspect the present invention provides thermal energy storage systems according to any of the previously provided aspects additionally comprising means for protection of the battery casing(s) against over pressurisation.

Commercial and industrial utilities of the energy storage systems herein will be dependent upon the melting point of the particular PCMs utilised. Typically, the thermal energy storage systems according to the present invention utilise PCMs having melting points ranging from 0° C. to 100° C., although this is not a limiting set and other exemplary melting points are 900° C. or −80° C. The selection of the particular PCM(s) to be utilised in any particular thermal energy storage system herein, will be dependent upon the desired application. Suitable PCMs for use herein are detailed herein after.

The operative range of these systems is dependent upon transition temperature band for the particular PCMs utilised. Typically, the transition temperature band for most PCMs is between a 4 and 8 degree difference in temperature (° C.). Thus according to a further aspect the present invention provides thermal energy storage systems according to any of the previously provided aspects wherein the PCM(s) utilised have melting points ranging from 0° C. to 100° C., and/or wherein the operative range of the PCM utilised is between a 4 and 8 degree difference in temperature. For the avoidance of doubt PCMs suitable for use herein are materials having a solid to liquid phase change or a solid to solid phase change, where in the latter the phase is intended as a change in the crystalline structure of the material. For the avoidance of doubt PCMs suitable for use herein may include thermochemical materials.

The selection of any particular PCM for use in any particular thermal storage system for any particular utility will be dependent upon which materials provide the most appropriate balance between their inherent thermodynamic, kinetic, chemical and physical properties and economic factors. Thermodynamic properties relevant to such selection include: a melting temperature within the desired operating temperature range; high latent heat of fusion per unit volume; high specific heat, high density and high thermal conductivity; small volume changes on phase transformation and small vapor pressure at operating temperatures to reduce the containment problem; congruent melting. Kinetic properties relevant to such selection include: high nucleation rate to avoid super-cooling of the liquid phase; high rate of crystal growth, so that the system can meet demands of heat recovery from the storage system. Chemical properties relevant to such selection include: chemical stability; complete reversible freeze/melt cycle; no degradation after a large number of freeze/melt cycles; non-corrosiveness, non-toxic, non-flammable and non-explosive materials. Relevant economic properties are the relative cost of the PCM and commercial availability in sufficient volume.

Suitable PCMs for use herein include: Calcium chloride/bromide hexahydrate eutectic, Calcium chloride/magnesium chloride hexahydrate, Calcium chloride hexahydrate, Calcium bromide hexahydrate, Sodium thiosulfate pentahydrate, Sodium acetate trihydrate.

Advantageously the thermal energy storage systems according to the present invention include means for PCM expansion management. As illustrated hereinafter in FIGS. 2, 3, 4 and 5, this is accomplished either by additional volume compensation features, or by pressurised case design features, in relation to each battery within the assembly. In thermal energy storage systems herein including a volume compensated, i.e. atmospheric pressure operated design, PCM expansion is managed using a diaphragm expansion vessel or a diaphragm expansion volume in each battery in order to maintain the pressure inside the battery at atmospheric level because the other side of the diaphragm is open to the atmosphere. Alternatively, an aperture is present in the enclosure to allow pressure balancing between the internal volume of the heat battery and the surroundings.

Figure 3A:
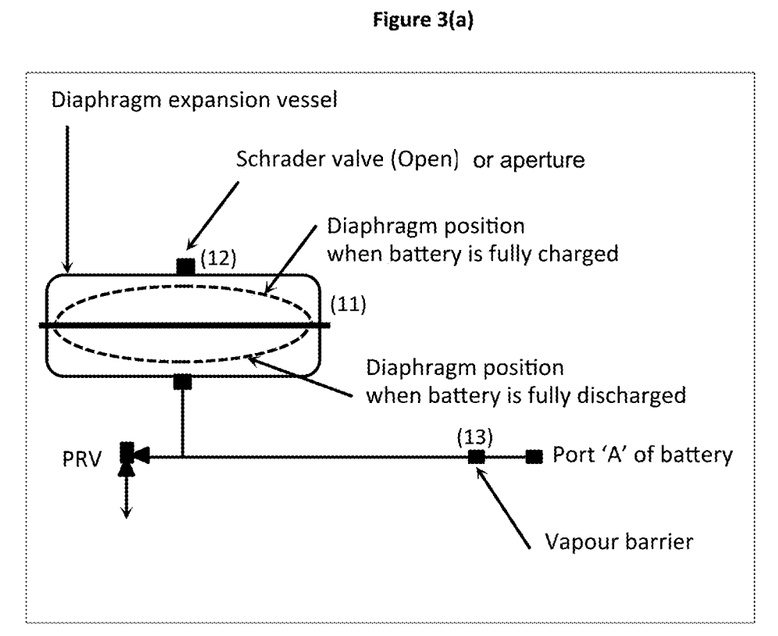
FIG. 3(a) is a schematic view of the volume compensation unit (9) as indicated in FIG. 2.

In thermal energy storage systems herein which incorporate batteries having volume compensated means for PCM expansion management, when the PCM volume changes (in any particular battery) with temperature, the air in the battery moves to and from the expansion vessel or the integrated expansion volume to maintain near constant atmospheric pressure in the battery casing or in the PCM volume. Suitable expansion vessels include those having a diaphragm design. For the avoidance of doubt, any alternative expansion vessel or integrated expansion volume design capable of equivalent operation to maintain near constant atmospheric pressure in the battery casing or in the PCM volume in line with PCM volume changes with temperature and subsequent air movement between the battery and said vessel or volume is considered suitable for use herein. An exemplar, diaphragm system is provided herein, and is illustrated in FIG. 3(a). In this system an expansion pipe connects the battery to the expansion vessel. This expansion pipe may additionally incorporate a vapour barrier, and either a pressure relief valve, or a burst disc assembly to protect the system against high pressure. Where a pressure relief valve is used the relief setting is typically between about 0.25 ba and about 0.5 bar. The thermal energy storage systems herein utilise a standard central heating expansion vessel rated at 3.0 bar wherein said vessel is sized according to the following equation:

$$V_{EX} = V_{PCM} \times (E_{PCM}/100) \times F_S$$

Wherein
$V_{EX}$=Nominal capacity of expansion vessel, [L]
$V_{PCM}$=Volume of PCM in the battery,
$E_{PCM}$=Expansion factor of PCM (8-12%)
$F_S$=Safety factor (=1.50)

Figure 4:
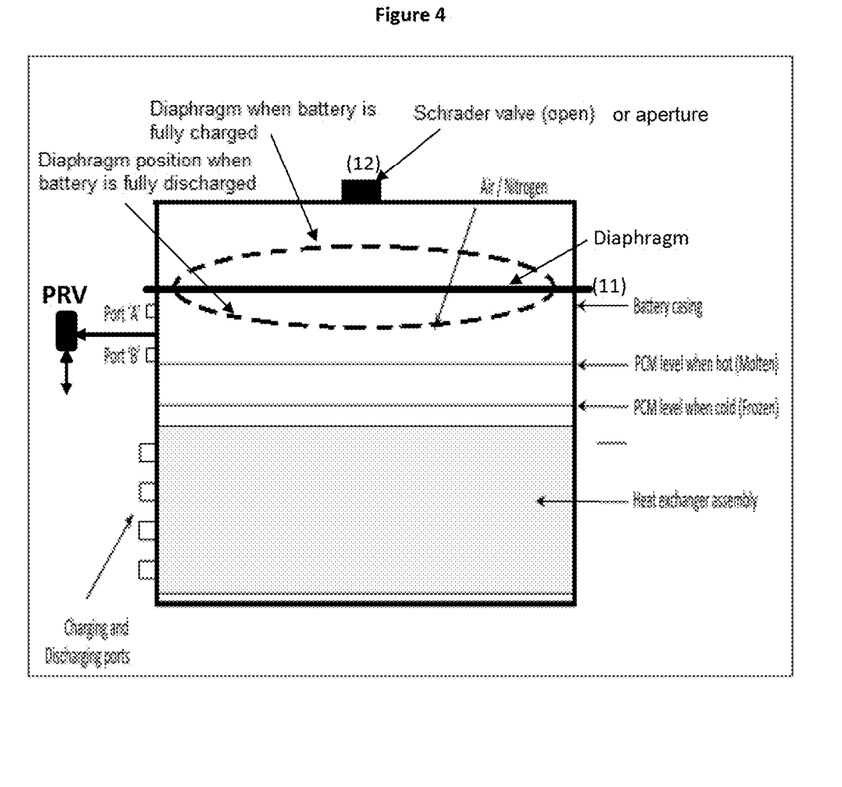
FIG. 4 is a schematic view of the integrated volume compensation unit.

FIG. 3(a) illustrates the operation of a diaphragm expansion vessel which may include a Schrader valve in which case it is left open or may include only an aperture to vent to atmosphere, and shows the relative positions of the diaphragm when the battery is both fully charged and when the battery is fully discharged. For the avoidance of doubt alternative valve designs may be utilised provided they can be left open. Another exemplar, integrated diaphragm system is provided herein, and is illustrated in FIG. 4. In this system a diaphragm is integrated in the battery case. The diaphragm may additionally act as vapour barrier and air barrier. FIG. 4 illustrates the operation of an integrated diaphragm expansion volume which includes a Schrader valve left open, or alternatively an aperture, and shows the relative positions of the diaphragm when the battery is both fully charged and when the battery is fully discharged. For the avoidance of doubt alternative valve designs may be utilised provided they may be left open.

In an alternative embodiment there is a hole in the top surface of the battery casing or alternatively a tube from this face (which may then take a serpentine path provided its final exit is at or above the level of said top surface). An inert fluid like silicone oil is floated on top of the PCM to perform the function of the diaphragm expansion vessel (including vapour and/or air barrier). At the final exit of the tube there may be a reservoir for the inert fluid.

In thermal energy storage systems herein including a pressurised case design, the casings of the individual batteries within the store assembly are sealed and the battery casings are designed to withstand the increase in pressure when the batteries are heated and the air volume is compressed. The batteries are fitted with a pressure sensor and either a pressure relief valve or a burst disc assembly to protect the system against high pressure. A detailed view of a pressurised case design in shown in FIG. 3(b) and an assembly incorporating batteries having pressure release valves is illustrated in FIG. 5. The pressure sensor associate with each battery is used both for monitoring the pressure within the battery case and also for determination of the charge state of the battery as described hereinafter. The height of the battery is sized to ensure that the volume of air in the battery casing above the PCM is sufficient to keep the pressure within the design working limits. The pressure relief valve is normally set at 1.5 times the design working pressure.

Thus according to a further aspect the present invention provides thermal energy storage systems according to any of the previously provided aspects having PCM expansion management means.

An additional advantage of the thermal energy storage systems of the present invention having a monitoring system as detailed hereinbefore is that they are able to predict the charge state of the batteries within the assembly.

The energy inputs and outputs and hence the balance in any individual battery in a battery storage stack of batteries within a thermal energy storage system according to the invention can be computed when the storage stack is fitted with suitable sensors. Illustration of how these sensors can be arranged are provided in FIGS. 2 and 5. For example the energy in battery number 4 (as illustrated) may be computed at any given time according to the following equations 2, 3 and 4:

$$Q_{IN} = [\Sigma(F_I \times \rho_I \times Cp_I) \times (T_5 - T_4)]/3600 \quad (2)$$

$$Q_{ON} = [\Sigma(F_O \times \rho_O \times Cp_O) \times (T_{10} - T_9)]/3600 \quad (3)$$

$$Q_N = O_{N-1} + Q_{IN} - Q_{ON} \quad (4)$$

Wherein
$Q_{IN}$=Energy input to the battery during the last charge cycle, [kWh]
$Q_{ON}$=Energy output from the battery during the last discharge cycle, [kWh]
$Q_N$=Current stored energy in the battery, [kWh]
$Q_{N-1}$=Energy stored in the battery before current audit, [kWh]
$F_I$=Charging circuit flow rate, [L/s]
$F_O$=Discharging circuit flow rate, [L/s]
$\rho_I$=Density of charging circuit fluid, [kg/L]
$\rho_O$=Density of discharging circuit fluid, [kg/L]
$Cp_I$=Specific heat of charging circuit fluid, [kJ/kg·K]
$Cp_O$=Specific heat of discharging circuit fluid, [kJ/kg·K]
$T_5$=Battery 4 charging circuit flow temperature [° C.]
$T_4$=Battery 4 charging circuit return temperature [° C.]
$T_{10}$=Battery 4 discharging circuit flow temperature [° C.]
$T_9$=Battery 4 discharging circuit return temperature [° C.]

As will be clear the measurement of any selected battery, X, may be determined via replacement of: $T_5$ by the relevant sensors for the measurement of $T_{XCFT}$, battery X charging circuit flow temperature; $T_4$ by the relevant sensors for the measurement of $T_X$, battery X charging circuit return; $T_{10}$ by the relevant sensors for the measurement of $T_{XDFT}$, battery X discharging circuit flow temperature; and $T_9$ by the relevant sensors for the measurement of $T_{XDFT}$, battery X discharging circuit return temperature.

An additional advantageous feature of the thermal energy storage systems of the present invention is that they are fitted with pressure sensors for monitoring their integrity and status. These pressure sensors can be used as an alternative or additional way to monitor the charge state of the batteries within the system, as the pressure in a pressurised case design will change depending on the state of charge as the PCM melts or freezes, thereby changing volume, thereby changing the volume of the air in the top of the battery, thereby changing the internal air pressure. Calibration can be used to create a look-up table that can convert measured pressure to state-of-charge.

The relationship between the change in state of charge of the PCM and the change of internal pressure and average temperature within the battery is illustrated in FIGS. 6(a) and 6(b), and with reference to FIG. 6(a), this is explained accordingly herein. During a first zone (or stage, or phase) i.e. between points 'A' and 'B' in FIG. 6(a), the PCM is solid i.e. frozen and therefore the change in pressure within the battery is mainly due to the change in temperature of the air within in the battery casing which will be a function of the temperature of the frozen PCM because the battery casing is highly insulated. The state of charge increases/decreases slowly because energy is mainly stored/releases in the sensible zone, i.e. the solid PCM increases/decreases its average temperature. In a further zone (or stage, or phase), illustrated in FIG. 6(a) between points 'B' and 'C', the PCM changes phase from solid to liquid during the battery heating cycle, and from liquid to solid during the battery discharge cycle. This so-called transition temperature band, for most PCMs, will be between 4° C. and 8° C. As such, the change in pressure within the battery during this phase will be directly proportional to the percentage of the PCM in a liquid (i.e. molten) state. In this zone, energy is stored/released as latent heat, due to the change in phase of the PCM. In the next zone (or stage, or phase), as illustrated in FIG. 6(a) between points 'C' and 'D', the PCM is fully melted and therefore the change in pressure within the battery is mainly due to the change in temperature of the air within in the battery casing which will be proportional to the temperature of the liquid (molten) PCM because the battery casing is highly insulated. The state of charge is mainly stored in the sensible zone, i.e. the solid PCM increases its average temperature. With reference to FIG. 6(b), this is explained accordingly herein. During a first zone (or stage, or phase) i.e. between points 'E' and 'F' in FIG. 6(b), the PCM is solid i.e. frozen and therefore the change in state of charge of the battery is a function of the temperature of the frozen PCM. The state of charge increases/decreases slowly because energy is mainly stored/releases in the sensible zone, i.e. the solid PCM increases/decreases its average temperature. In a further zone (or stage, or phase), illustrated in FIG. 6(b) between points 'F' and 'G', the PCM changes phase from solid to liquid during the battery heating cycle, and from liquid to solid during the battery discharge cycle. This so-called transition temperature band, for most PCMs, will be between 4° C. and 8° C. In this zone, energy is stored/released as latent heat, due to the change in phase of the PCM. In the next zone (or stage, or phase), as illustrated in FIG. 6(b) between points 'G' and 'H', the PCM is fully melted and therefore the change in state of charge within the battery will be proportional to the temperature of the liquid (molten) PCM. The state of charge is mainly stored in the sensible zone, i.e. the liquid PCM increases its average temperature.

It is clear from FIGS. 6(a) and 6(b) that battery pressure and average temperature are complementary to each other and give an exhaustive indication of the state of charge of the battery, i.e. temperature is a good indicator of the state of charge of the battery outside the melting/freezing zone, and pressure is a good indicator of the state of charge of the battery in the melting/freezing zone. The relationship between pressure and state of charge or temperature and state of charge may not be linear as in FIGS. 6(a) and 6(b), or may not be linear in every zone.

In case the enclosure presents an aperture to surroundings, pressure would be steady at any state of charge of the battery. In this case, additionally to the temperature, the level of the PCM can be used as complementary indicator of the state of charge of the battery. As this particular system requires an additional substance to protect the PCM against water vapour, air, and contaminants exchange, e.g. an oil, this substance could change its level according to expansion and contraction of the PCM in chamber external to the enclosure of the battery, e.g. a graduated cylinder, that allows visual indication of the state of charge of the battery and/or electronic measure via a level sensor, for example an ultrasonic level sensor or a float arm tied to a rotational sensor. This could be achieved also in the enclosure volume, by adding a transparent cut-out in case of visual indication or a level sensor in the heat battery above the PCM/additional substance system for electronic measures.

It is anticipated that the maximum working pressure will be similar for all battery types i.e. volume of air in the battery to absorb expansion of the PCM during heating will increase in proportional to the volume of PCM in the battery. However for utility herein any particular battery types would be type tested to determine the pressure-temperature characteristics and this data would be stored in the PCM store controller.

The power rating of the charging and discharging circuits of the battery will affect the pressure-temperature characteristic and therefore these parameters will be stored in the controller for correcting these.

The algorithms used for determining the status of the battery using the control system detailed herein are described hereinafter below and the symbols used are detailed in Table 1. The state of charge of the battery is defined as a fraction of the maximum energy that can be stored in the battery between a minimum and a maximum temperature, which can vary according to the final application, to the PCM in the battery, and to safety requirements. The maximum energy storable is composed by three quantities, according to the following description. The symbols used are detailed in Table 1:

1) Sensible heat due to the temperature difference between the solid state material at the beginning of the melting zone, $T_F$ in FIG. 6(b), and the base reference temperature, $T_E$ in FIG. 6(b):

$$E_{SS}=m_{PCM} \cdot Cp_S \cdot \delta T_{EF}/3600$$

2) Latent heat due to the phase change of the material during melting/freezing process. This is a property of each PCM and proportional to the amount of PCM in the battery:

$$E_L=m_{PCM} \cdot H_L/3600$$

3) Sensible heat due to the temperature difference between the liquid state material at the maximum temperature limit, $T_H$ in FIG. 6(b), and the temperature of the liquid state material at the beginning of the freezing zone, $T_G$ in FIG. 6(b):

$$E_{SL}=m_{PCM} \cdot Cp_L \cdot \delta T_{GH}/3600$$

4) Total storable energy is therefore:

$$E_{TOT}=E_{SS}+E_L+E_{SL}$$

TABLE 1

| Symbol | Definition | Measurement |
| --- | --- | --- |
| $E_{SS}$ | Sensible heat in the solid phase | kWh |
| $m_{PCM}$ | Mass of PCM in the battery | kg |
| $Cp_S$ | Specific heat capacity in solid state | kJ/kg K |
| $\delta T_{EF}$ | Temperature range between the base reference temperature and the lower temperature limit of the melting zone | K |
| $E_L$ | Latent heat in the phase change zone | kWh |
| $H_L$ | Specific latent heat | kJ/kg |
| $E_{SL}$ | Sensible heat in the liquid phase | kWh |
| $Cp_L$ | Specific heat capacity in liquid state | kJ/kg K |
| $\delta T_{GH}$ | Temperature range between the higher temperature limit of the melting zone and the maximum temperature limit | K |
| $E_{TOT}$ | Total storable energy | kWh |

The algorithms used for determining the status of the battery using the control system detailed herein are described hereinafter below and the symbols used are detailed in Table 2.

a) If (Q=1 and $\delta P \leq P_{L1}$) OR (Q=1 and $P_{BC} \leq P_A$), then:
Battery case is not air tight
Activate appropriate alarm/warning
Put this battery in standby mode i.e. stop charging b) If (Q=1 and $\delta P \geq P_{L2}$) OR (Q=1 and $P_{BC} \geq P_{L3}$), then:
Battery case pressure is exceeding the maximum operating limit
Activate appropriate alarm/warning
Put this battery in standby mode i.e. stop charging c) If (Q=0 and $T_{BC} \leq T_E$), then:
Put this battery in charging mode Q=1 i.e. start charging
SOC=0 d) If (Q=1 and $\delta T \geq T_{L2}$) OR (Q=1 and $T_{BC} \geq T_{L3}$), then:
Battery case temperature is exceeding the maximum operating limit
Activate appropriate alarm/warning Put this battery in standby mode i.e. stop charging e) If $(P_{AB1} \leq ABS(\delta P) \leq P_{AB2})$ OR $(P_A \leq P_{BC} \leq P_B)$ OR $(T_E \leq T_{BC} \leq T_F)$ OR $T_{EF1} \leq ABS(\delta T) \leq T_{EF2})$, then the battery is operating in zone AB (See FIG. 6(a)) corresponding to zone EF (See FIG. 6(b)) SOC=100·$m_{PCM}$·$Cp_s$·$\delta T_s/E_{TOT}$ f) If $(P_{BC1} \leq ABS(\delta P) \leq P_{BC2})$ OR $(P_B \leq P_{BC} \leq P_C)$ OR $(T_F \leq T_{BC} \leq T_G)$ OR $(T_{FG1} \leq ABS(\delta T) \leq T_{FG2})$, then the battery is operating in zone BC (See FIG. 6(a)) corresponding to zone FG (See FIG. 6(b)) SOC=100·$(Es_L + F_{BC} \cdot C_{BC} \cdot P_B)/E_{TOT}$ g. If $(P_{CD1} \leq ABS(\delta P) \leq P_{CD2})$ OR $(P_C \leq P_{BC} \leq P_D)$ OR $(T_G \leq T_{BC} \leq T_H)$ OR $(T_{GH1} \leq ABS(\delta T) \leq T_{GH2})$, then the battery is operating in zone CD (See FIG. 6(a)) corresponding to zone GH (See FIG. 6(b)) SOC=100·$(Es_L + E_L + m_{PCM} \cdot Cp_L \cdot \delta T_L)/E_{TOT}$

TABLE 2

| Symbol | Definition | Measurement |
|---|---|---|
| $Q_{IN}$ | Battery charging state | 1 = Active, 0 = Standby |
| $\delta P$ | Rate of pressure change | Pa/s |
| $P_{L1}$ | Minimum rate of pressure change limit | Pa/s |
| $P_{BC}$ | Battery case pressure | Pa |
| $P_A$ | Base reference pressure | Pa |
| $P_{L2}$ | Maximum rate of pressure change limit | Pa/s |
| PL3 | Maximum battery case working pressure | Pa |
| $T_{BC}$ | Battery case temperature | K |
| $T_E$ | Base reference temperature | K |
| SOC | State of charge of the battery | |
| $\delta T$ | Rate of temperature change | K/s |
| $T_{L2}$ | Maximum rate of temperature change limit | K/s |
| $T_{L3}$ | Maximum battery case working temperature | K/s |
| $P_{AB1}$ | Rate of pressure change in zone AB - Lower limit | Pa/s |
| $P_{AB2}$ | Rate of pressure change in zone AB - Upper limit | Pa/s |
| $P_A$ | Battery pressure at operating point A in FIG. 6(a) | Pa |
| $P_B$ | Battery pressure at operating point B in FIG. 6(a) | Pa |
| $T_F$ | Battery temperature at operating point F in FIG. 6(b) | K |
| $T_{EF1}$ | Rate of temperature change in zone EF - Lower limit | K/s |
| $T_{EF2}$ | Rate of temperature change in zone EF - Upper limit | K/s |
| $\delta T_s$ | Temperature difference between battery temperature $T_{BC\ and}$ minimum reference temperature $T_E$ | K |
| $P_{BC1}$ | Rate of pressure change in zone BC - Lower limit | Pa/s |
| $P_{BC2}$ | Rate of pressure change in zone BC - Upper limit | Pa/s |
| $P_C$ | Battery pressure at operating point C in FIG. 6(a) | Pa |
| $T_G$ | Battery temperature at operating point G in FIG. 6(b) | K |
| $T_{FG1}$ | Rate of temperature change in zone FG - Lower limit | K/s |
| $T_{FG2}$ | Rate of temperature change in zone FG - Upper limit | K/s |
| $F_{BC}$ | Scaling factor for - Zone BC | — |
| $C_{BC}$ | Correction factor (Power & PCM) | — |
| $P_{CD1}$ | Rate of pressure change in zone CD - Lower limit | Pa/s |
| $P_{CD2}$ | Rate of pressure change in zone CD - Upper limit | Pa/s |
| $P_C$ | Battery pressure at operating point C in FIG. 6(a) | Pa |
| $P_D$ | Battery pressure at operating point D in FIG. 6(a) | Pa |
| $T_G$ | Battery temperature at operating point G in FIG. 6(b) | K |
| $T_H$ | Battery temperature at operating point H in FIG. 6(b) | K |
| $T_{GH1}$ | Rate of temperature change in zone GH - Lower limit | K/s |
| $T_{GH2}$ | Rate of temperature change in zone GH - Upper limit | K/s |
| $\delta T_L$ | Temperature difference between battery temperature $T_{BC}$ and upper temperature of the melting zone $T_G$ | K |

When a plurality of heat exchanger is enclosed in the same casing, load and discharge ports of each heat exchanger can be connected to those of another heat exchanger in order (a) to maximize the increase (discharge phase) or the drop (load phase) in temperature from the inlet to the outlet of the heat exchanger assembly (serial connection), or in order (b) to minimize the flow rate and related pressure drop between the inlet and the outlet of the heat exchanger assembly (parallel connection). In the same enclosure, both serial and parallel connections can be used to connect different heat exchangers. Furthermore, each connection can be configured on demand to be parallel or serial according to the requirement and to the controlling strategies, e.g. connections are normally parallel to minimize the pressure drop and are temporarily changed to serial through diverter valves when extra power is required, eventually using a boost pump to overcome the pressure drop. Furthermore, different heat exchangers in the same enclosure can utilize different and independent hydraulic circuits. Furthermore, a thermal insulation can be placed between single heat exchangers in the same enclosure to avoid thermal dissipation between different part of the same enclosure at different state of charge, e.g. composite sheets or foam cell insulation or insulation foils.

Figure 1A:
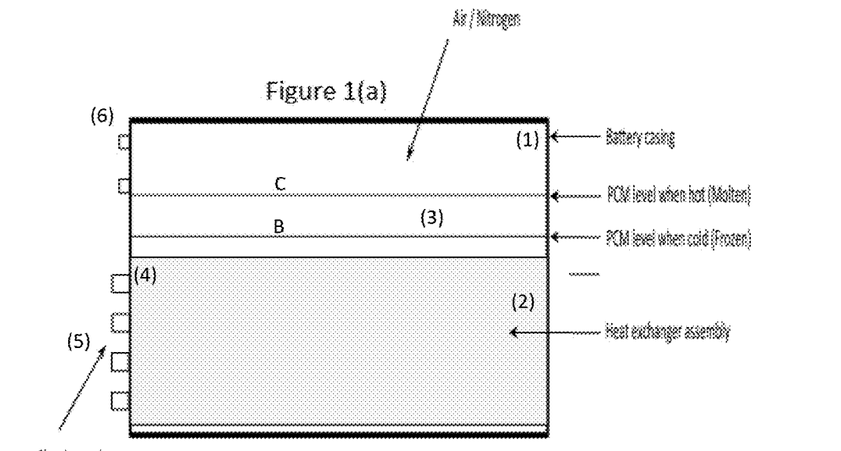
FIG. 1(a) is a side view of a single battery case and internal assembly thereof for use in a thermal storage system as detailed herein. Despite the image showing a rectangular section, the present invention is not limited to this and includes batteries of different shape, e.g. cylindrical, triangular, and more. Furthermore, a single heat exchanger can be designed in order to accommodate a horizontal thermal insulating layer between different parts of the heat exchanger, to avoid thermal dissipation between parts of the heat exchanger at different temperature. This can be a composite sheet or an insulating foil.
Figure 1B:
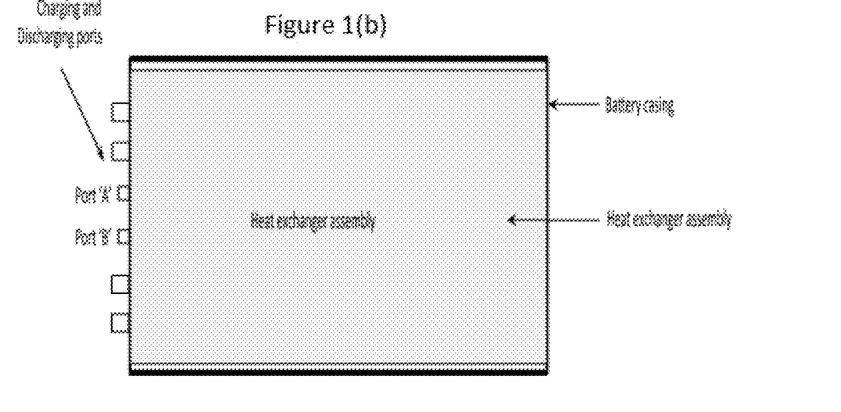
FIG. 1(b) is an underside view of the single battery case and internal assembly of FIG. 1(a). Despite the image showing a rectangular section, the present invention is not limited to this and includes battery of different shape, e.g. cylindrical, triangular, and more. Furthermore, a single heat exchanger can be designed in order to accommodate a vertical thermal insulating layer between different parts of the heat exchanger, to avoid thermal dissipation between parts of the heat exchanger at different temperature. This can be a composite sheet or an insulating foil or insulating foam.

In FIG. 1(a) a battery case (1) containing one or more heat exchangers (2) and a PCM (3) is illustrated. Internal volume A, between the PCM and the battery casing, is filled with a gas, e.g. air or nitrogen, and varies in volume according to the expansion and contraction of the PCM level. The different PCM levels when cold (frozen) and hot (molten) are illustrated by points B and C. The heat exchangers inside the battery case are anchored via a plurality of supports (4). Various charging and discharging ports are indicated by (5). Further connection ports are indicated by (6).

Figure 2:
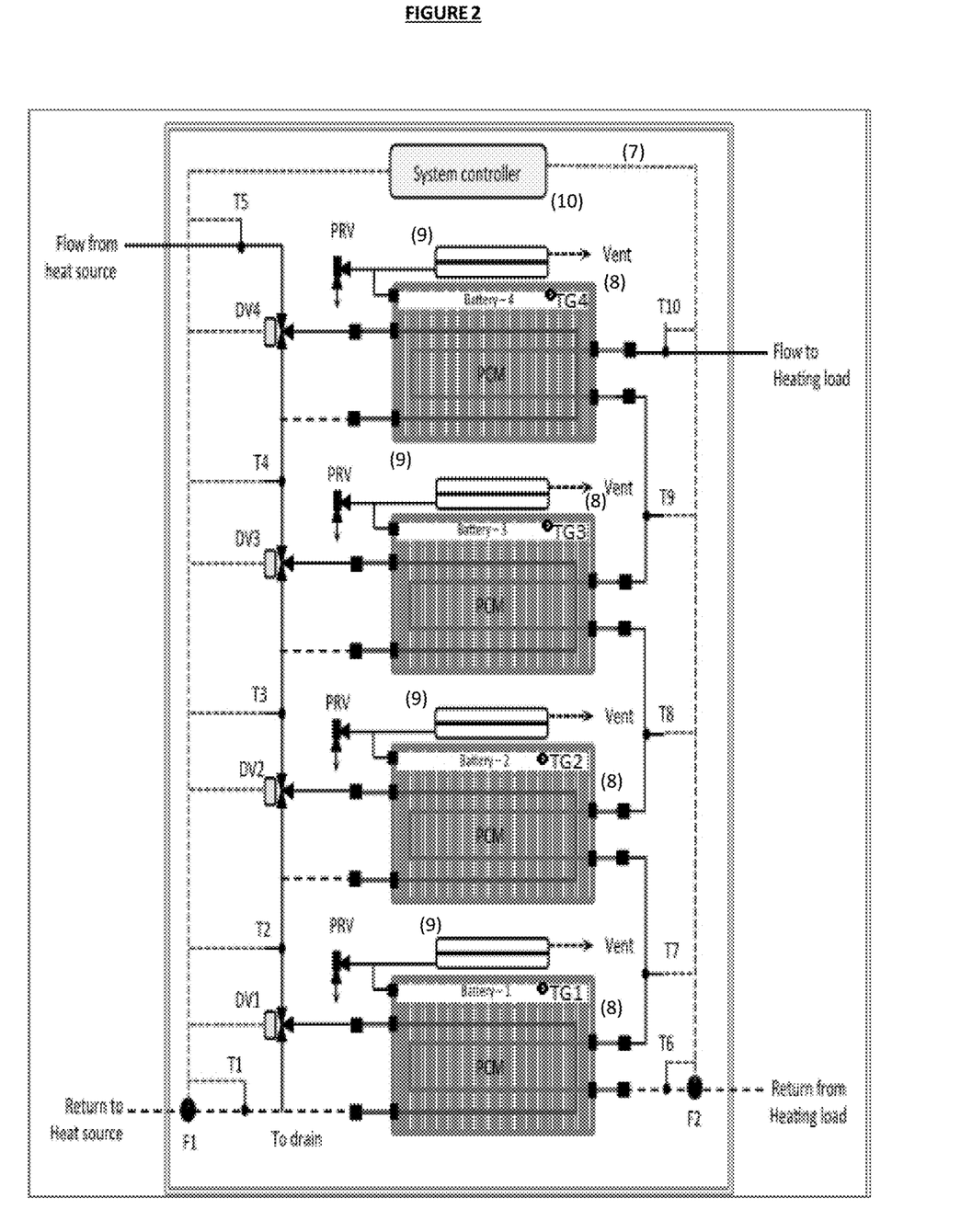
FIG. 2 is a schematic view of a thermal storage system according to an embodiment of the present invention. Despite the image showing heat exchangers with vertical and straight fins, the present invention is not limited to this and includes battery(s) with different inclination, e.g. horizontal or oblique, and not straight, e.g. corrugated. Despite the image showing two separate circuits for loading and discharging the battery, the invention also includes heat batteries with one single hydraulic circuit that, alternatively, is used to charge and discharge the heat battery, or with more than two hydraulic circuits. Despite FIG. 2 showing four modules, this invention applies to all system(s) with one or more modules.

In FIG. 2 thermal storage system (7) for the management of flow from a heat source (not illustrated) to a heating load (not illustrated) which contains a plurality of inter-connected battery assemblies (8), as specifically indicated by batteries 1 to 4, is illustrated, with each battery assembly being in operative connection with at least one volume compensation unit (9) having means for venting, and wherein the integral control system (10) manages the operation of the system via sensors F1 and F2, which measure the charging and discharging circuit flow rates respectively, temperature sensors (T1, T2, T3, T4, T5) which measure the temperature of the heat flow into the battery assembly and diverter valves (DV1, DV2, DV3, DV4, DV5) to control efficient charging of the individual batteries, temperature sensors (T6, T7, T8, T9, T10) to determine the energy delivered by each battery and the residual energy in each battery during discharging, and pressure relief valves (PRV).

In FIG. 3(a) a diaphragm expansion vessel (11) having positions relating to a fully charged or fully discharged state represented by a dotted line and thickened line respectively, and having a Schrader valve (12), a vapour barrier (13), a pressure release valve (PRV) and a connection port A for a battery (within the assembly).

Figure 3B:
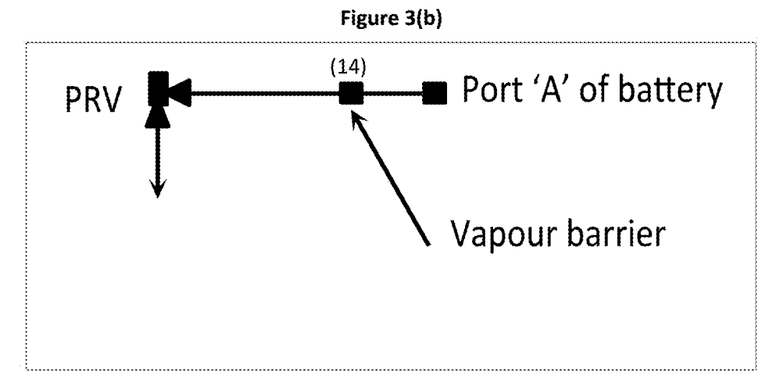
FIG. 3(b) is an expanded view of the pressure release valve aspect of unit (8) as indicated in FIG. 5.

In FIG. 3(b) a vapour barrier (14), a pressure release valve (PRV) and a connection port A for a battery (within the assembly) are shown.

In FIG. 4 the diaphragm is integrated in the battery enclosure. Positions relating to a fully charged or fully discharged state represented by a dotted line and thickened line respectively, and having a Schrader valve (12), a pressure release valve (PRV). In FIG. 5 where components or features having the same indicia as for FIG. 2 are provided, these are representative of the same components or features, unless otherwise specifically indicated. FIG. 5 illustrates a thermal storage system (7) contains a plurality of interconnected battery assemblies (8), batteries 1 to 4, is illustrated, with each battery assembly being sealed and in operative connection with at least one pressure release valve (PRV) in operative connection with pressure sensors (PS1, PS2, PS3, PSS4) to determine the charge status of the batteries, and wherein the integral control system (10) manages the operation of the system via sensors F1, F2, T1, T2, T3, T4, T5, T6, T7, T8, T9, and T10, diverter valves DV1, DV2, DV3, DV4, and DV5 as detailed in the description for FIG. 2.

Figure 6:
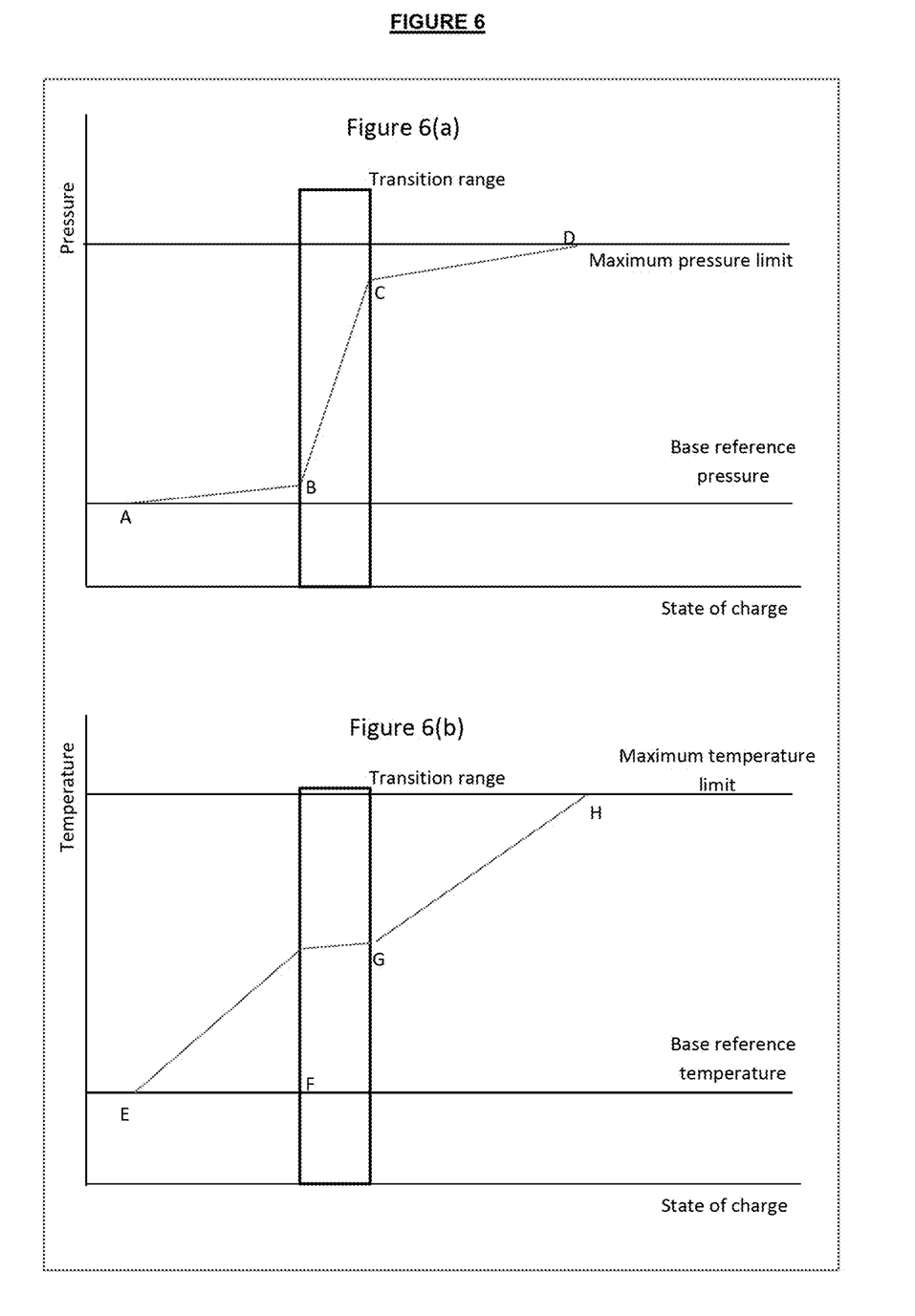

In FIG. 6 the following zones are indicated which illustrate the relationship between the change in temperature of the PCM and the change of internal pressure within the battery: between points 'A' and 'B' the PCM is solid; between points 'B' and 'C', the PCM changes phase from solid to liquid during the battery heating cycle, and from liquid to solid during the battery discharge cycle; and between points 'C' and 'D', the PCM is fully melted.

The novel thermal energy storage systems according to the present invention are assembled from a plurality of heat batteries each containing an integrated loading and unloading circuits.

The invention claimed is:

1. A thermal energy storage system comprising a thermal energy store containing a single or a plurality of battery casings having
   internal heat exchangers, phase change materials, and an integral system controller for controlling operation of the thermal energy store,
   wherein the integral system controller is adapted to determine the status of the batteries within the thermal energy storage system via the following series of algorithms:
   a) If (Q=1 and $\delta P \leq P_{L1}$) OR (Q=1 and $P_{BC} \leq P_A$), then:
      Battery case is not air tight
      Activate appropriate alarm/warning
      Put this battery in standby mode (Q=0)
   b) If (Q=1 and $\delta P \geq P_{L2}$) OR (Q=1 and $P_{BC} \geq P_{L3}$), then:
      Battery case pressure is exceeding the maximum operating limit
      Activate appropriate alarm/warning
      Put this battery in standby mode (Q=0)
   c) If (Q=0 and $T_{BC} \leq T_E$), then:
      Put this battery in charging mode (Q=1)
      SOC=0
   d) If (Q=1 and $\delta T \geq T_{L2}$) OR (Q=1 and $T_{BC} \geq T_{L3}$), then:
      Battery case temperature is exceeding the maximum operating limit
      Activate appropriate alarm/warning
      Put this battery in standby mode (Q=0)
   e) If ($P_{AB1} \leq ABS(\delta P) \leq P_{AB2}$) OR ($P_A \leq P_{BC} \leq P_B$) OR ($T_E \leq T_{BC} \leq T_F$) OR $T_{EF1} \leq ABS(\delta T) \leq T_{EF2}$), then the battery is operating in zone AB corresponding to zone EF SOC=100·$m_{PCM}$·$Cp_s$·$\delta T_s/E_{TOT}$
   f) If ($P_{BC1} \leq ABS(\delta P) \leq P_{BC2}$) OR ($P_B \leq P_{BC} \leq P_C$) OR ($T_F \leq T_{BC} \leq T_G$) OR ($T_{FG1} \leq ABS(\delta T) \leq T_{FG2}$), then the battery is operating in zone BC corresponding to zone FG SOC=100·($Es_L + F_{BC}·C_{BC}·P_B$)/$E_{TOT}$
   g. If ($P_{CD1} \leq ABS(\delta P) \leq P_{CD2}$) OR ($P_C \leq P_{BC} \leq P_D$) OR ($T_G \leq T_{BC} \leq T_H$) OR ($T_{GH1} \leq ABS(\delta T) \leq T_{GH2}$), then the battery is operating in zone CD corresponding to zone GH SOC=100·($ES_L + E_L + m_{PCM}·Cp_L·\delta T_L$)/$E_{TOT}$ wherein the preceding symbols are defined as follows:
Q=Battery charging state;
$\delta P$=Rate of pressure change;
ABS($\delta P$)=absolute value of Rate of pressure change;
$P_{L1}$=Minimum rate of pressure change limit;
$P_{BC}$=Battery case pressure;
$P_A$=Base reference pressure;
$P_{L2}$=Maximum rate of pressure change limit;
$P_{L3}$=Maximum battery case working pressure;
$T_{BC}$=Battery case temperature;
$T_E$=Base reference temperature;
SOC=State of charge of the battery;
$\delta T$=Rate of temperature change;
ABS($\delta T$)=absolute value of rate of temperature change;
$T_{L2}$=Maximum rate of temperature change limit;
$T_{L3}$=Maximum battery case working temperature;
$P_{AB1}$=Rate of pressure change in zone AB—Lower limit;
$P_{AB2}$=Rate of pressure change in zone AB—Upper limit;
$P_A$=Battery pressure where the phase change material remains in a solid state;
$P_B$=Battery pressure where the phase change material remains in a solid state but begins to change phase from solid to liquid;
$T_E$=Battery temperature where the phase change material remains in a solid state;
$T_F$=Battery temperature where the phase change material remains in a solid state but begins to change phase from solid to liquid;
$T_{EF1}$=Rate of temperature change in zone EF—Lower limit;
$T_{EF2}$=Rate of temperature change in zone EF—Upper limit;
$\delta T_s$=Temperature difference between battery temperature IBC and minimum reference temperature $T_E$;
$P_{BC1}$=Rate of pressure change in zone BC—Lower limit;
$P_{BC2}$=Rate of pressure change in zone BC—Upper limit;
$P_C$=Battery pressure where the phase change material has changed from solid to liquid);
$T_G$=Battery temperature at a pressure where the phase change material has changed from solid to liquid;
$T_{FG1}$=Rate of temperature change in zone FG—Lower limit;
$T_{FG2}$=Rate of temperature change in zone FG—Upper limit;
$F_{BC}$=Scaling factor for—Zone BC;
$C_{BC}$=Correction factor (Power & PCM);

$P_{CD1}$=Rate of pressure change in zone CD—Lower limit;
$P_{GD2}$=Rate of pressure change in zone CD—Upper limit;
$P_C$=Battery pressure where the phase change material has changed from solid to liquid;
$P_D$=Battery pressure at a maximum pressure limit;
$T_G$=Battery temperature at a battery pressure where the phase change material has changed from solid to liquid;
$T_H$=Battery temperature at a maximum temperature limit;
$T_{GH1}$=Rate of temperature change in zone GH—Lower limit;
$T_{GH2}$=Rate of temperature change in zone GH—Upper limit; and
$\delta T_L$=Temperature difference between battery temperature $T_{BC}$ and upper temperature of the melting zone $T_G$.

2. A thermal energy storage system according to claim 1, wherein the integral system controller is provided by one or a plurality of sensors for the measurement of power at one or multiple points within the system.

3. A thermal energy storage system according to claim 1, further comprising a plurality of sensors for determining the energy inputs and outputs of, and the balance within, any individual battery (8) within the system via a series of sensors for the determination of $Q_{IN}$, $Q_{ON}$ and $Q_N$ wherein $$Q_{IN}=[\Sigma(F_I \times \rho_I \times Cp_I) \times (T_5-T_4)]/3600; \text{ and}$$

$$Q_{ON}=[\Sigma(F_O \times \rho_O \times Cp_O) \times (T_{10}-T_9)]/3600; \text{ and}$$

$$Q_N=Q_{N-1}+Q_{IN}-Q_{ON}; \text{ and}$$

wherein
$Q_{IN}$=Energy input to the battery during the last charge cycle;
$Q_{ON}$=Energy output from the battery during the last discharge cycle;
$Q_{IN}$=Current stored energy in the battery;
$O_{N-1}$=Energy stored in the battery before current audit;
$F_I$=Charging circuit flow rate;
$F_O$=Discharging circuit flow rate;
$\rho_I$=Density of charging circuit fluid;
$\rho_O$=Density of discharging circuit fluid;
$Cp_I$=Specific heat of charging circuit fluid;
$Cp_O$=Specific heat of discharging circuit fluid;
$T_5$=Battery X charging circuit flow temperature;
$T_{10}$=Battery X charging circuit return temperature;
$T_{10}$=Battery X discharging circuit flow temperature; and
$T_9$=Battery X discharging circuit return temperature.

4. A thermal energy storage system according to claim 1, wherein the integral system controller is adapted to provide measurements of the charging and discharging circuit flow rates of the system via one or more power sensors.

5. A thermal energy storage system according to claim 1, wherein the integral system controller is adapted to provide efficient charging of the individual batteries within the assembly via one or more input temperature sensors and one or more diverter valves.

6. A thermal energy storage system according to claim 1, wherein the integral system controller is adapted to provide measurements of energy stored within, and power input of individual batteries within the system via the one or more input temperature sensors.

7. A thermal energy storage system according to claim 1, wherein the integral system controller is adapted to provide measurements of the energy delivered by each battery within the assembly and the residual energy in each of the batteries during discharging via one or more output temperature sensors.

8. A thermal energy storage system according to claim 1, wherein the battery casings are constructed from metals, alloys, plastics, composite sandwiches or composite materials.

9. A thermal energy storage system according to claim 1, wherein the battery casings can withstand an internal pressure of from 0.0 bar to 4.0 mbar.

10. A thermal energy storage system according to claim 1, wherein multiple battery casings can be stacked without intermediate supports.

11. A thermal energy storage system according to claim 1, wherein the phase change materials within the system are protected from contact with external contaminants or degrading components via the provision of sealed battery casings.

12. A thermal energy storage system according to claim 1, wherein each battery casing independently contains: (i) a battery comprising one or more heat exchangers anchored within the casing, (ii) a phase change material, and (iii) one or more pressure relief valves, or one or more pressure rupture discs for protection against over pressurization of the battery.

13. A thermal energy storage system according to claim 12, wherein the one or more heat exchangers are integrated loading and unloading heat exchangers which are anchored within the batteries and wherein the contact area between each heat exchanger and each battery casing is minimal.

14. A thermal energy storage system according to claim 1, wherein the phase change materials utilized within the batteries have a solid to liquid phase change within a temperature range of from 0° C. to 100° C. and wherein the operative range of the phase change materials is between a 4 and 8 degree difference in temperature.

15. A thermal energy storage system according to claim 1, further comprising a means for phase change material expansion management in operative connection with a vapour barrier and either a pressure relief valve, or a burst disc assembly.

16. A thermal energy storage system according to claim 15, wherein the means for phase change material expansion includes external or internal volume compensation features, or pressurized case design features, in relation to each individual battery within the assembly.

\* \* \* \* \*

UNITED STATES PATENT AND TRADEMARK OFFICE
CERTIFICATE OF CORRECTION

PATENT NO. : 11,428,477 B2
APPLICATION NO. : 16/395831
DATED : August 30, 2022
INVENTOR(S) : Andrew John Bissell et al.

It is certified that error appears in the above-identified patent and that said Letters Patent is hereby corrected as shown below:

In the Claims
Column 18, Line 57, delete "IBC" and insert therefore --$T_{BC}$--; and
Column 19, Line 43, delete "$T_{10}$" and insert therefore --$T_4$--.

Signed and Sealed this
Eighteenth Day of October, 2022

Katherine Kelly Vidal
*Director of the United States Patent and Trademark Office*